United States Patent
Nishimura et al.

(10) Patent No.: US 6,877,259 B2
(45) Date of Patent: Apr. 12, 2005

(54) PIN ASSEMBLY AND IMPLEMENTS CONNECTING APPARATUS

(75) Inventors: Masao Nishimura, Hirakata (JP); Tetsuo Ohnishi, Yawata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/652,514

(22) Filed: Sep. 2, 2003

(65) Prior Publication Data

US 2004/0060210 A1 Apr. 1, 2004

(30) Foreign Application Priority Data

Aug. 30, 2002 (JP) ....................................... 2002-252825

(51) Int. Cl.⁷ ................................................. E02F 3/96
(52) U.S. Cl. ............................. 37/468; 37/403; 37/409; 414/723; 403/324
(58) Field of Search ........................... 37/468, 403, 409, 37/231; 414/723; 172/272, 273, 275; 403/320–325, 31

(56) References Cited

U.S. PATENT DOCUMENTS

| | | | | |
|---|---|---|---|---|
| 2,967,726 A | * | 1/1961 | Weston | 403/157 |
| 3,198,563 A | * | 8/1965 | Steidl | 403/154 |
| 3,554,588 A | * | 1/1971 | Reinsma et al. | 403/154 |
| 3,778,174 A | * | 12/1973 | Molby | 403/143 |
| 3,997,274 A | * | 12/1976 | Iverson | 403/10 |
| 4,096,957 A | * | 6/1978 | Iverson et al. | 414/715 |
| 4,243,341 A | * | 1/1981 | Kabay et al. | 403/16 |
| 4,251,182 A | * | 2/1981 | Schroeder | 414/723 |
| 4,288,173 A | * | 9/1981 | Nick | 404/49 |
| 4,398,862 A | * | 8/1983 | Schroeder | 414/723 |
| 4,629,350 A | * | 12/1986 | Siewert et al. | 403/11 |
| 4,772,150 A | * | 9/1988 | Horton | 403/39 |
| 5,494,396 A | * | 2/1996 | Geier et al. | 414/723 |
| 5,630,673 A | * | 5/1997 | Krzywanos et al. | 403/158 |
| 5,769,557 A | * | 6/1998 | Beals et al. | 403/162 |
| 5,951,192 A | * | 9/1999 | Collins | 403/150 |
| 5,967,738 A | * | 10/1999 | Warthold | 414/723 |
| 6,108,951 A | * | 8/2000 | Renfrow et al. | 37/468 |
| 6,241,455 B1 | * | 6/2001 | Schupback et al. | 414/723 |
| 6,283,667 B1 | * | 9/2001 | Neitzel | 403/158 |
| 6,579,024 B2 | * | 6/2003 | Trowbridge | 403/34 |

FOREIGN PATENT DOCUMENTS

| | | |
|---|---|---|
| JP | 06-057785 | 1/1994 |
| JP | 09-111804 | 4/1997 |
| JP | 2002-212973 | 7/2002 |

* cited by examiner

Primary Examiner—Thomas B. Will
Assistant Examiner—Thomas A Beach
(74) Attorney, Agent, or Firm—Varndell & Varndell, PLLC

(57) ABSTRACT

The invention provides a pin assembly and Implements connecting apparatus which can replace a working device such as a bucket or the like easily and for a short time. A first member (20) having a pair of brackets (18, 19) is connected to a second member (22) having a boss portion (21). First member (20) and second member (21) are connected so as to swing freely and mutually by inserting a pin assembly (17) having an outer tubular body (15) and a connection pin (16) rotatably connected thereto into one bracket (18), boss portion (21) and another bracket (19). In a connected state, outer tubular body (15) and boss portion (21) are fixed. Pin assembly (17) can be pulled out by applying a pressing force to an opposite side in an inserting direction of pin assembly (17).

15 Claims, 12 Drawing Sheets

PIN ASSEMBLY AND IMPLEMENTS CONNECTING APPARATUS

BACKGROUND OF THE INVENTION

1. Field of the Invention

The present invention relates to a pin assembly used in implements or the like of a construction machine such as a excavator or the like, and implements connecting apparatus.

2. Description of the Background Art

A construction machine such as a excavator or the like is generally provided with a lower traveling body, and upper revolving body attached to the lower traveling body so as to revolve freely via a revolving mechanism, and implements is connected to the upper revolving body. Implements is provided with a boom in which a base portion is swingably connected to the upper revolving body, an arm which is swingably connected to a leading end of the boom, and a working means which is swingably connected to a leading end of the arm.

Further, the working means includes a bucket for carrying out a segment excavating work or the like, a crushing device for crushing a concrete or the like, and the like. Further, there is a case that the bucket or the like is damaged. Accordingly, in the construction machine mentioned above, it is necessary that the bucket or the like can be replaced. Therefore, as implements connecting apparatus for connecting the arm to the bucket, there has been conventionally a structure in which the bucket can be detached, for example, as shown in Japanese Unexamined Patent Publication No. 6-57785.

That is, implements connecting apparatus is, as shown in FIG. 12, provided with a hollow shaft 81, a connection pin 82 which is inserted to the hollow shaft 81, and the like. In this case, a bush 85 is inward fitted to a boss portion 84 of an arm 83, and the hollow shaft 81 is inserted and fitted to the bush 85. The boss portion 84 is interposed between a pair of brackets 87 and 88 of the bucket 86, and the connection pin 82 is inserted through pin insertion holes 89 and 89 of the brackets 87 and 88 and the hollow shaft 81. Further, the connection pin 82 is constituted by a shaft main body 82a and a base portion large diameter portion 82b. In this case, under an inserted state, the connection pin 82 is structured such that the base portion large diameter portion 82b is brought into contact with an outer surface of one bracket 87, a leading end portion 90 of the shaft main body 82a protrudes from another bracket 88, and a come-off prevention pin 91 is mounted to the leading end portion 90. That is, a through hole 92 extending in a direction approximately orthogonal to a pin axial direction is provided in the leading end portion 90, and a cap 93 is fitted to the leading end portion. Further, the come-off prevention pin 91 constituted by a bolt member is inserted through the cap 93 and the through hole 92, and a nut member 94 is engaged with the come-off prevention pin 91. Accordingly, it is possible to connect the arm 83 to the bucket 86 via implements connecting apparatus.

Further, a recess portion 95 is provided on an inner peripheral surface of the bush 85, a lubricant is charged (attached) to the recess portion 95, a recess peripheral groove is provided on an outer peripheral surface of the hollow shaft 81, and a seal member 96 such as an O-ring or the like is fitted to the recess peripheral groove.

Accordingly, in implements connecting apparatus in FIG. 12, the come-off prevention pin 91 can be pulled out by screwing the nut member 94 backward and detaching the nut member 94 from the come-off prevention pin 91, and the connection pin 82 can be pulled out by pulling out the come-off prevention pin 91, so that the bucket 86 can be detached from the arm 83.

However, it is necessary to detach the hollow shaft 81 from the bush 85 of the boss portion 84 as well as to pull out the come-off prevention pin 91, at a time of detaching. Further, in the case of attaching the bucket 86 from the detached state, it is necessary to charge the lubricant to the recess portion 95 on the inner peripheral surface of the bush 85 as well as to insert and fit the hollow shaft 81 to the bush 85 of the boss portion 84, and it is also necessary to thereafter insert the connection pin 82 to the brackets 87 and 88 and the hollow shaft 81 so as to fit the cap 93 to the leading end portion of the connection pin 82 and attach the come-off prevention pin 91. Accordingly, attaching and detaching works are troublesome, a working time becomes long and an operability is inferior.

SUMMARY OF THE INVENTION

The present invention is made for the purpose of solving the conventional defect mentioned above, and an object of the present invention is to provide a pin assembly and a implements connecting apparatus which can replace a working means such as a bucket or the like easily and for a short time.

Accordingly, in accordance with a first aspect of the present invention, there is provided a pin assembly for connecting a first member having a pair of brackets to a second member having a boss portion so as to freely mutually swing in a state in which the boss portion is interposed between a pair of brackets, comprising:

an outer tubular body which is inserted into the boss portion and is fixed to the boss portion; and a connection pin which is rotatably inserted to the outer tubular body, is fixed to one bracket in a side of one end portion thereof, and is inserted and supported to another bracket in a side of another end portion thereof, wherein the outer tubular body and the connection pin are inserted to the one bracket, the boss portion and another bracket, in an assembled state.

In accordance with the pin assembly on the basis of the first aspect mentioned above, it is possible to connect the first member to the second member so as to swing freely and mutually by inserting the pin assembly to one bracket, the boss portion and another bracket. Accordingly, the connecting work is easily carried out, and the outer tubular body and the connection pin are assembled before connecting the first member to the second member, and it is possible to intend to shorten the connecting work in the field or the like. Further, in the inserted state, since the outer tubular body is fixed to the boss portion, and the connection pin is fixed to one bracket in the side of one end portion thereof, and inserted and supported to another bracket in the side of another end portion, the connection state between the first member and the second member becomes stable.

In accordance with a second aspect of the present invention, there is provided a pin assembly, in which the outer tubular body and the boss portion are fixed by a press fit.

In accordance with the pin assembly on the basis of the second aspect mentioned above, it is possible to intend to simplify the fixing work between the outer tubular body and the boss portion.

In accordance with a third aspect of the present invention, there is provided a pin assembly, in which a press fit portion press fitted to the boss portion is formed in a rear end side in an inserting direction of the outer tubular body.

In accordance with the pin assembly on the basis of the third aspect mentioned above, since the press fit portion is formed in the rear end side in the inserting direction of the outer tubular body, it is unnecessary to press fit the leading end side in the inserting direction of the outer tubular body to the boss portion. Accordingly, it is possible to easily insert the leading end side in the inserting direction to the first and second member, and it is possible to easily press fit as a whole and intend to improve a connection operability.

In accordance with a fourth aspect of the present invention, there is provided a pin assembly, in which a sliding member is interposed between the connection pin and the outer tubular body.

In accordance with the pin assembly on the basis of the fourth aspect mentioned above, since the sliding member is interposed between the connection pin and the outer tubular body, the connection pin can smoothly rotate with respect to the outer tubular body. Accordingly, it is possible to carry out a relative swing between the first member and the second member smoothly.

In accordance with a fifth aspect of the present invention, there is provided a pin assembly, in which an oil reserving recess portion extending along an axial direction is provided on an outer peripheral surface of the connection pin.

In accordance with the pin assembly on the basis of the fifth aspect mentioned above, it is possible to reserve the lubricating oil in the oil reserving recess portion on the outer peripheral surface of the connection pin, and it is possible to rotate the connection pin with respect to the outer tubular body further smoothly.

In accordance with a sixth aspect of the present invention, there is provided a pin assembly, in which a collar portion is provided in a rear end side in the inserting direction of the connection pin, and a marking portion for checking a position of the oil reserving recess portion is provided on an outer end surface of the collar portion.

In accordance with the pin assembly on the basis of the sixth aspect mentioned above, it is possible to check the position of the oil reserving recess portion by means of the marking portion provided on the outer end surface of the collar portion in the connection pin. Accordingly, it is possible to carry out the inserting work while targeting the marking portion, and it is possible to intend to improve an assembling operability by the pin assembly.

In accordance with a seventh aspect of the present invention, there is provided a pin assembly, further comprising a seal apparatus for sealing a rotating side and a fixed side.

In accordance with the pin assembly on the basis of the seventh aspect mentioned above, it is possible to prevent foreign materials such as the segment or the like from making an intrusion into an inner portion of the pin assembly by the seal apparatus, and it is possible to prevent the lubricating oil or the like from flowing out to the outer portion from the inner portion of the pin assembly.

In accordance with an eighth aspect of the present invention, there is provided a implements connecting apparatus for connecting a first member having a pair of brackets to a second member having a boss portion interposed between the brackets, wherein a pin assembly having an outer tubular body and a connection pin rotatably inserted to the outer tubular body is assembled and formed, the pin assembly is moved along an axial direction thereof so as to be inserted to the one bracket, the boss portion and another bracket, the first member and the second member are connected so as to swing freely and mutually, at least the outer tubular body of the pin assembly and the boss portion are fixed in the connection state, and the pin assembly is allowed to be pulled out by applying a pressing force to an opposite side to the inserting direction of the pin assembly.

In accordance with implements connecting apparatus on the basis of the eighth aspect mentioned above, it is possible to connect the first member to the second member so as to swing freely and mutually by moving the pin assembly along the axial direction thereof so as to insert to one bracket, the boss portion and another bracket. Further, it is possible to pull out the pin assembly by applying the pressing force in the opposite side to the insertion direction to the pin assembly, whereby the pin assembly is pulled out, so that it is possible to separate the first member and the second member. That is, it is possible to easily connect and separate the first member and the second member, and it is possible to intend to shorten a time for the replacing work.

In accordance with a ninth aspect of the present invention, there is provided a implements connecting apparatus, in which a screw hole is provided in one bracket, a through hole is provided in a collar portion provided in a rear end side in an inserting direction of the pin assembly, a bolt member inserted through the through hole is temporarily fastened to the screw hole, and the pin assembly is inserted to the bracket of the first member and the boss portion of the second member by forward screwing the nut member engaged with the bolt member.

In accordance with implements connecting apparatus on the basis of the ninth aspect mentioned above, it is possible to insert the pin assembly to the bracket of the first member and the boss portion of the second member by inserting the bolt member through the through hole of the collar portion in the pin assembly so as to temporarily fasten to the screw hole of one bracket and forward screwing the nut member engaged with the bolt member, whereby it is possible to carry out the connecting work between the first member and the second member easily and securely.

In accordance with a tenth aspect of the present invention, there is provided a implements connecting apparatus, in which the collar portion of the pin assembly is fixed to one bracket by inserting the bolt member to the through hole of the collar portion in the pin assembly and screwing the bolt member with the screw hole of the one bracket.

In accordance with implements connecting apparatus on the basis of the tenth aspect mentioned above, it is possible to fix the collar portion of the pin assembly to one bracket by using the through hole of the pin assembly and the screw hole of the bracket which are used at a time of press fitting the pin assembly, and screwing the bolt member. Accordingly, it is possible to securely hold the connection state. That is, it is possible to intend to make the structure for fixing and the structure for press fitting common, and it is possible to achieve a simplification of implements connecting apparatus.

In accordance with an eleventh aspect of the present invention, there is provided a implements connecting apparatus, in which a screw hole is provided in the collar portion of the pin assembly, and the bolt member presses one bracket by forward screwing the bolt member engaged with the screw hole so as to pull out the pin assembly.

In accordance with implements connecting apparatus on the basis of the eleventh aspect mentioned above, it is possible to pull out the pin assembly by forward screwing the bolt member with respect to the screw hole of the collar portion in the pin assembly. Accordingly, it is possible to carry out a separating work between the first member and the second member easily and securely.

In accordance with a twelfth aspect of the present invention, there is provided a implements connecting apparatus, in which the second member is an arm of implements, and the first member is a working means such as a bucket or the like connected to the arm in a replaceable manner.

In accordance with implements connecting apparatus on the basis of the twelfth aspect mentioned above, since the second member is the arm of implements, and the first member is the working means such as the bucket or the like connected to the arm in a replaceable manner, it is possible to carry out a work for attaching and detaching the bucket or the like with respect to the arm for a short time. Accordingly, it is possible to intend to improve an operability of the replacement of the bucket or the like, it is possible to achieve shortening the working time in the working field or the like, and an improvement of the working efficiency can be achieved.

In accordance with a thirteenth aspect of the present invention, there is provided a implements connecting apparatus, in which implements connecting apparatus uses the pin assembly as recited in any one of the first aspect to the seventh aspect mentioned above.

In accordance with implements connecting apparatus on the basis of the thirteenth aspect mentioned above, since implements connecting apparatus uses the pin assembly as recited in any one of the first aspect to the seventh aspect mentioned above, it is possible to achieve the operation and effect of the pin assembly effectively.

DESCRIPTION OF THE PREFERRED EMBODIMENT

Figure 11:
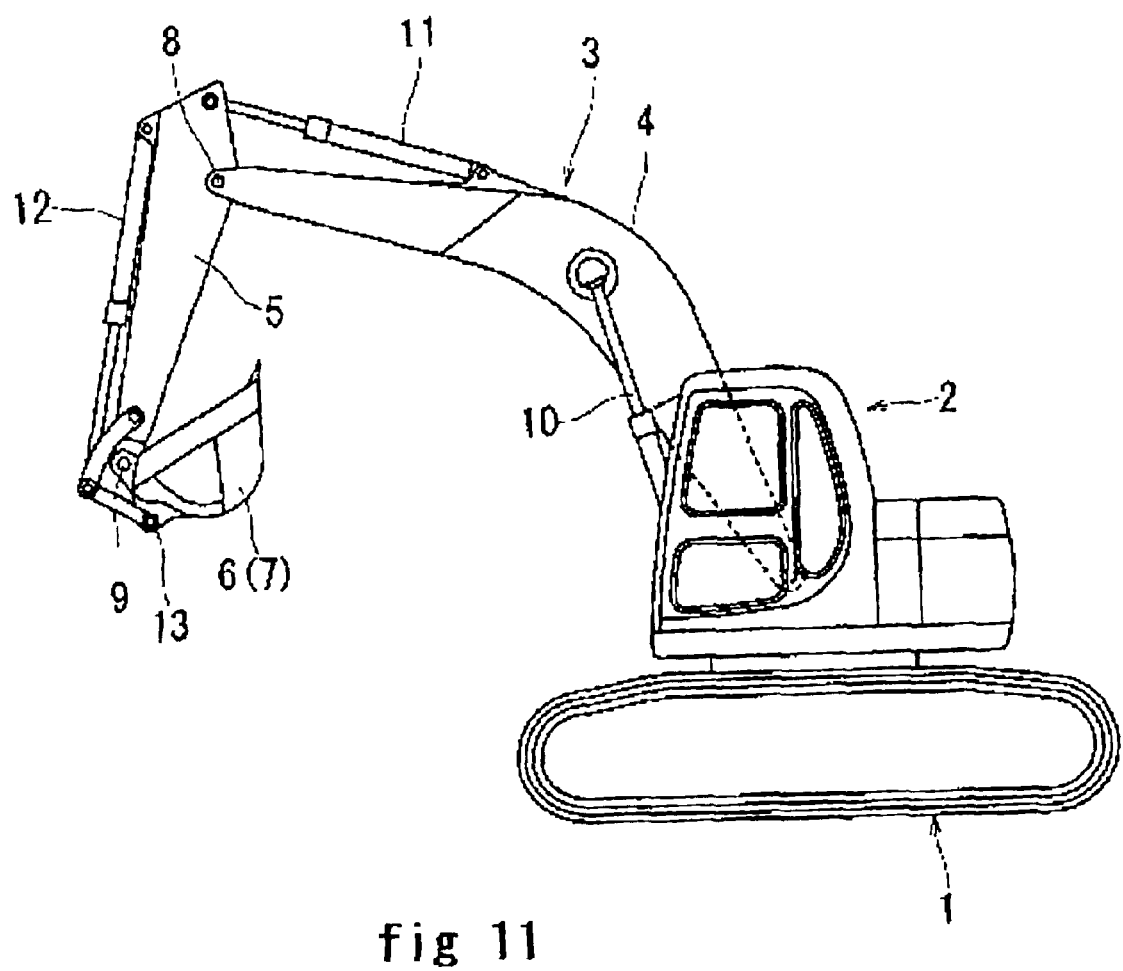
FIG. 11 is a brief view of a construction machine in which implements connecting apparatus is used.
Figure 12:
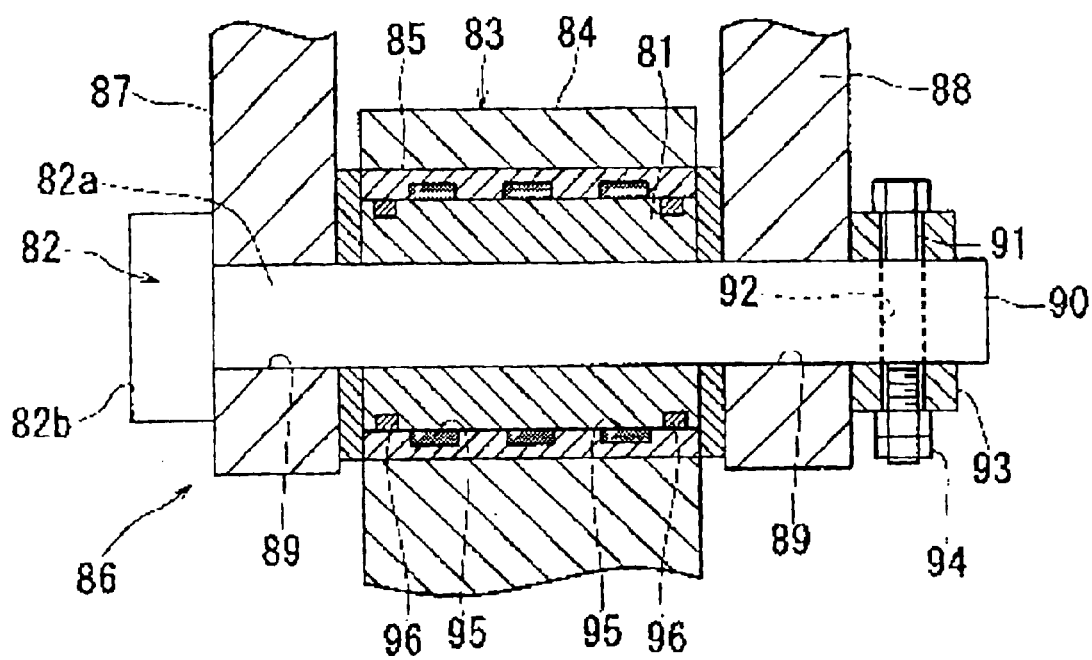
FIG. 12 is a cross sectional view of a conventional implements connecting apparatus.

Next, a description will be given in detail of a specific embodiment of a pin assembly and a implements connecting apparatus in accordance with the present invention. FIG. 11 shows a brief view of a construction machine (a excavator) in which implements connecting apparatus is used. The construction machine is provided with a lower traveling body 1 and an upper revolving body 2 which is attached to the lower traveling body 1 via a revolving mechanism so as to freely revolve, and a implements 3 is connected to the upper revolving body 2. Implements 3 is provided with a boom 4 in which a base portion is swingably connected to the upper revolving body 2 via a pivotally connecting means (not shown), an arm 5 which is swingably connected to a leading end of the boom 4 via a pivotally connecting means 8, and a working means 6 which is swingably connected to a leading end of the arm 5 via a pivotally connecting means 9. In this case, the working means 6 is shown as a bucket 7 for carrying out a segment excavating work or the like. In this case, the working means 6 may employ a crushing device for crushing a concrete or the like, and the like in addition to the bucket 7. Further, a bracket of the bucket 7 is supported to the leading end of the arm 5 by the pivotally connecting means 9 in the manner mentioned above, and other portions of the bracket are supported to a link by a pivotally connecting means 13.

Figure 7:
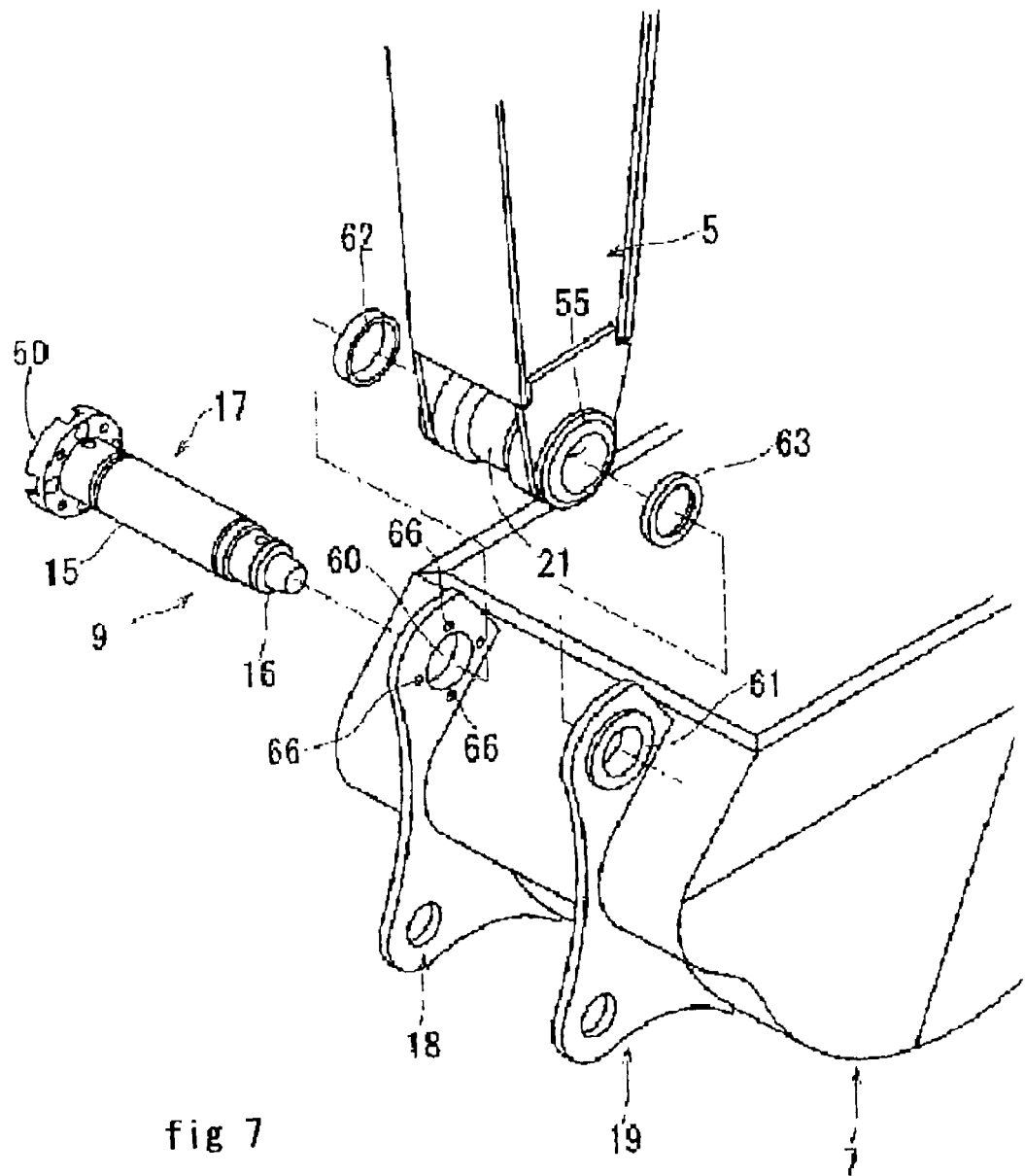
FIG. 7 is a perspective view of a bucket and an arm which are connected by implements connecting apparatus.

Further, the boom 4 is swung by driving the boom swinging cylinder 10, the arm 5 is swung by driving the arm swinging cylinder 11, and the bucket 7 is swung by driving the bucket swinging cylinder 12. In this case, as shown in FIG. 7, implements connecting apparatus in accordance with the present invention is used for the pivotally connecting means 9 for pivotally connecting the arm 5 to the bucket 7.

Figure 1:
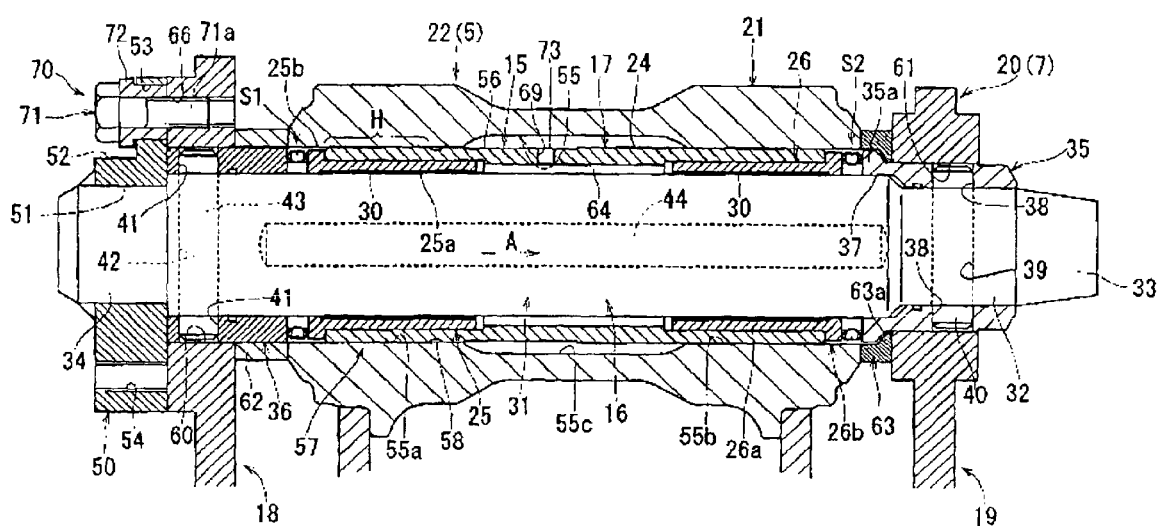
FIG. 1 is an enlarged cross sectional view of a implements connecting apparatus in accordance with one embodiment of the present invention.

This implements connecting apparatus is, as shown in FIG. 1, such as to use a pin assembly 17, and the pin assembly 17 is provided with a pin assembly 17 having an outer tubular body 15 and a connection pin 16 rotatably inserted to the outer tubular body 15, and connects a first member 20 (in this case, the bucket 7 mentioned above) having a pair of brackets 18 and 19 to a second member 22 (in this case, the arm 5 mentioned above) having a boss portion 21 interposed between the brackets 18 and 19.

Figure 3:
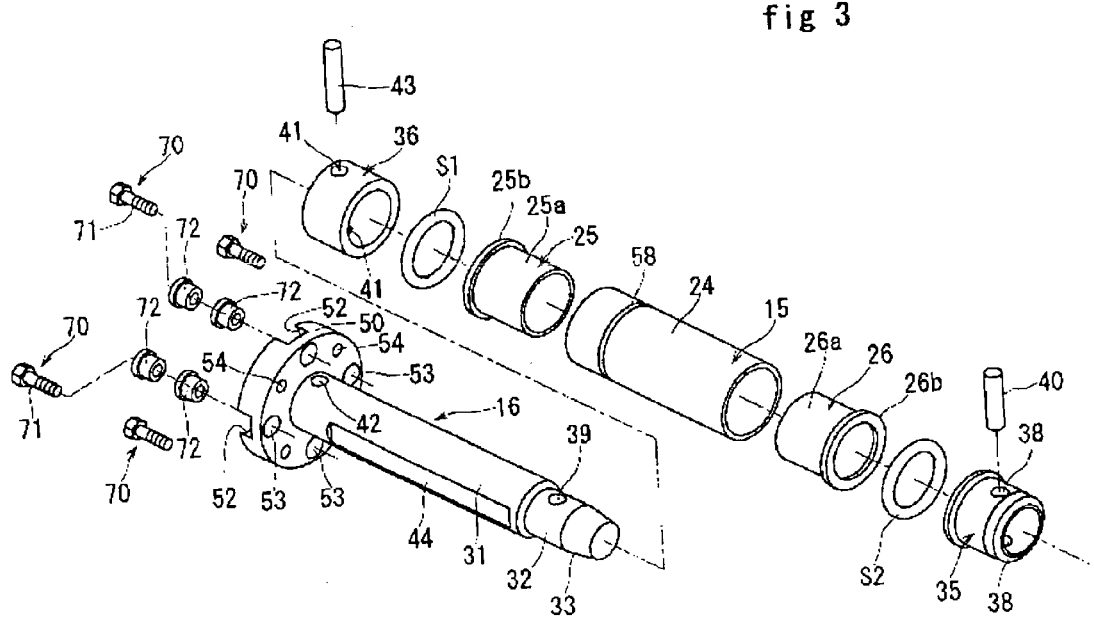
FIG. 3 is an exploded perspective view of the pin assembly.

As shown in FIG. 1 and an exploded perspective view FIG. 3, the outer tubular body 15 is constituted by a cylinder body 24, and end portion tube bodies 25 and 26 inserted to both end portions of the cylinder body 24. Further, the end portion tube bodies 25 and 26 are respectively constituted by tube main bodies 25a and 26a and collar portions 25b and 26b, and the respective tube main bodies 25a and 26a are press fitted and fixed to both end portions of the cylinder body 24. Further, in the end portion tube bodies 25 and 26, the collar portions 25b and 26b become in a state of being brought into contact with end surfaces of the cylinder body 24, at a time when the tube main bodies 25a and 26a are press fitted. Further, sliding members 30 are formed on inner peripheral surfaces of the end portion tube bodies 25 and 26. In this case, the sliding member 30 means a structure which can reserve a lubricating oil, and can be structured, for example, by a copper sintered metal or the like.

Further, the connection pin 16 has a large diameter main body portion 31, a leading end side small diameter portion 32, a leading end tapered portion 33 and a base end small diameter portion 34. A leading end tube body 35 is outward fitted to the leading end side small diameter portion 32, and a base end tube body 36 is outward fitted to a base end side of the main body portion 31. Further, the leading end tube body 35 is structured such that an outer collar portion 35a is provided in a base end portion of an outer peripheral surface thereof, and a recess peripheral portion 37 is provided in a base end portion of an inner peripheral surface thereof.

Figure 4:
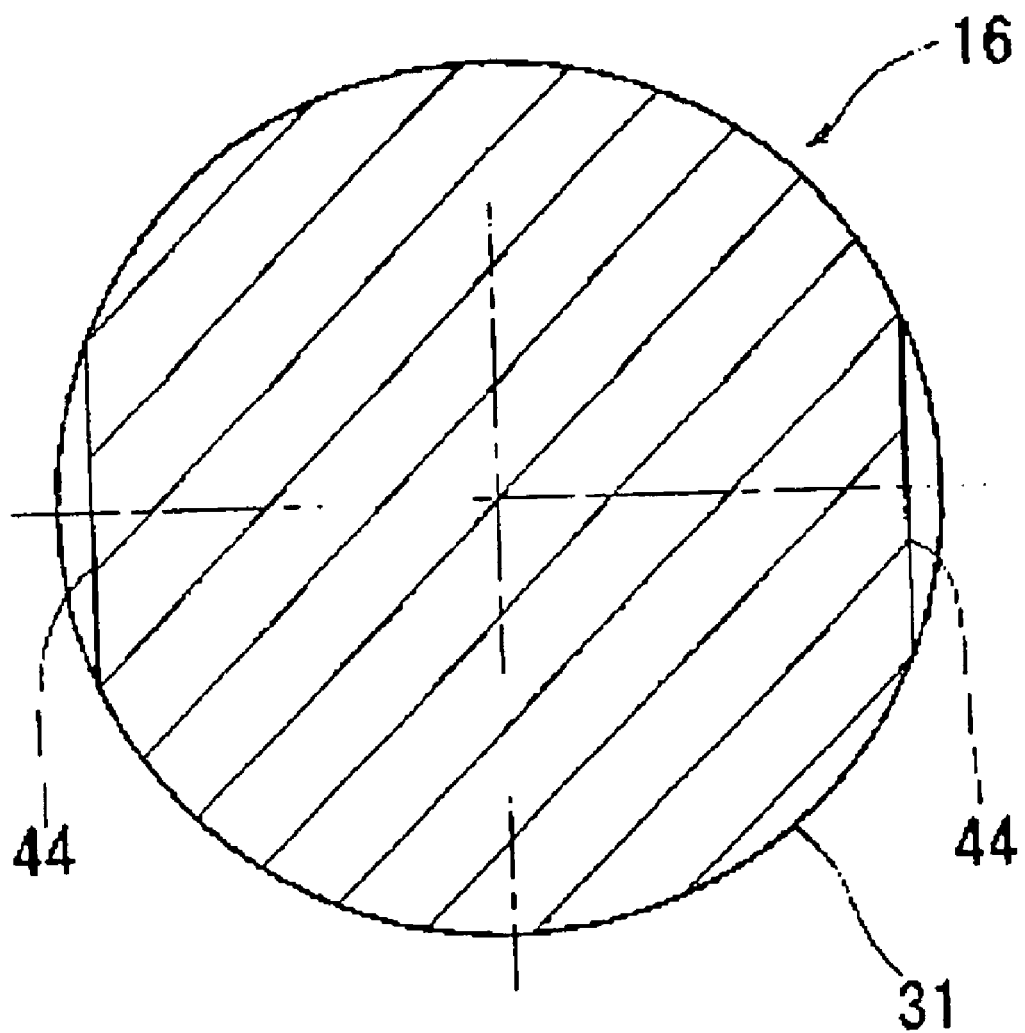
FIG. 4 is an enlarged cross sectional view of a connection pin of the pin assembly.
Figure 5:
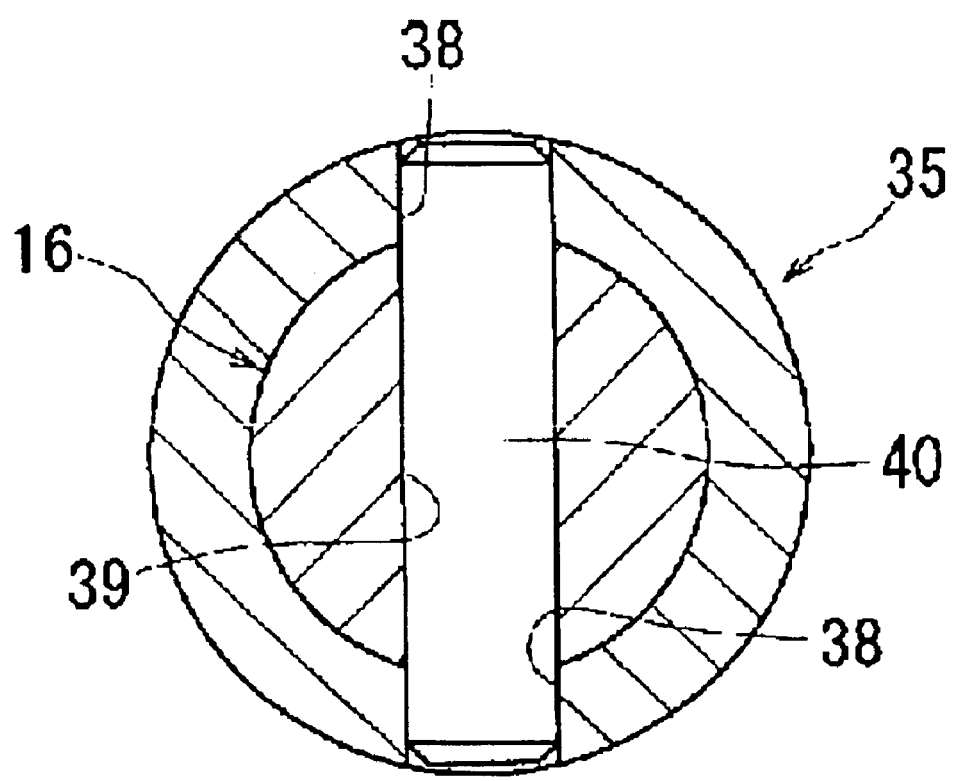
FIG. 5 is a cross sectional view of a leading end tubular body of the pin assembly.

Accordingly, there is established a state in which the leading end portion of the main body portion 31 having a large diameter is fitted to the recess peripheral portion 37. Further, as shown in FIGS. 1 and 5, through holes 38 and 38 are provided in the leading end tube body 35, a through hole 39 is provided in the leading end side small diameter portion 32 of the connection pin 16 in correspondence to the through holes 38 and 38, and a pin 40 is press fitted to the through holes 38 and 38 and the through hole 39. Accordingly, the leading end tube body 35 is fixed to the leading end side small diameter portion 32 of the connection pin 16. Further, through holes 41 and 41 are provided in the base end tube body 36, a through hole 42 is provided in the main body portion 31 of the connection pin 16 in correspondence to the through holes 41 and 41, and a pin 43 is press fitted to the through holes 41 and 41 and the through hole 42. Accordingly, the base end tube body 36 is fixed to the main body portion 31 of the connection pin 16. Further, an oil reserving recess portion 44 constituted by a notch portion which is formed along about a whole length of the main body portion 31 is provided on an outer peripheral surface of the main body portion 31 in the connection pin 16, as shown in FIGS. 1 and 4.

Figure 6:
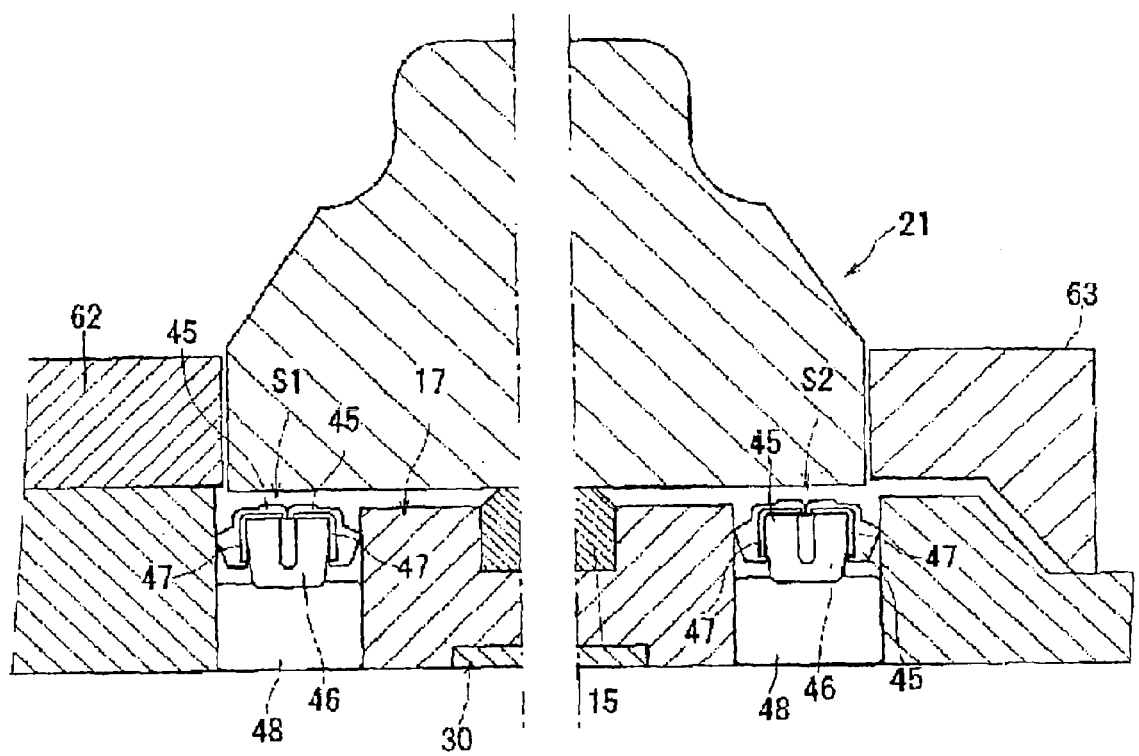
FIG. 6 is an enlarged cross sectional view of a main portion of the pin assembly.

Further, seal apparatuses S1 and S2 are respectively interposed between the base end tube portion 36 and the end portion tube body 25, and between the leading end tube body 35 and the end portion tube body 26. The seal apparatuses S1 and S2 are structured such as to seal the rotation side and the fixed side, and are provided, as shown in FIG. 6, with a pair of seal rings 45 and 45 and a load ring interposed between the seal rings 45 and 45. The seal rings 45 and 45 are integrally formed with supporting rings 47 and 47 having an L-shaped cross section, respectively. Further, the seal apparatuses S1 and S2 are respectively arranged in outer peripheral sides of ring bodies 48 and 48 which are outward fitted to the connection pin 16.

Figure 2:
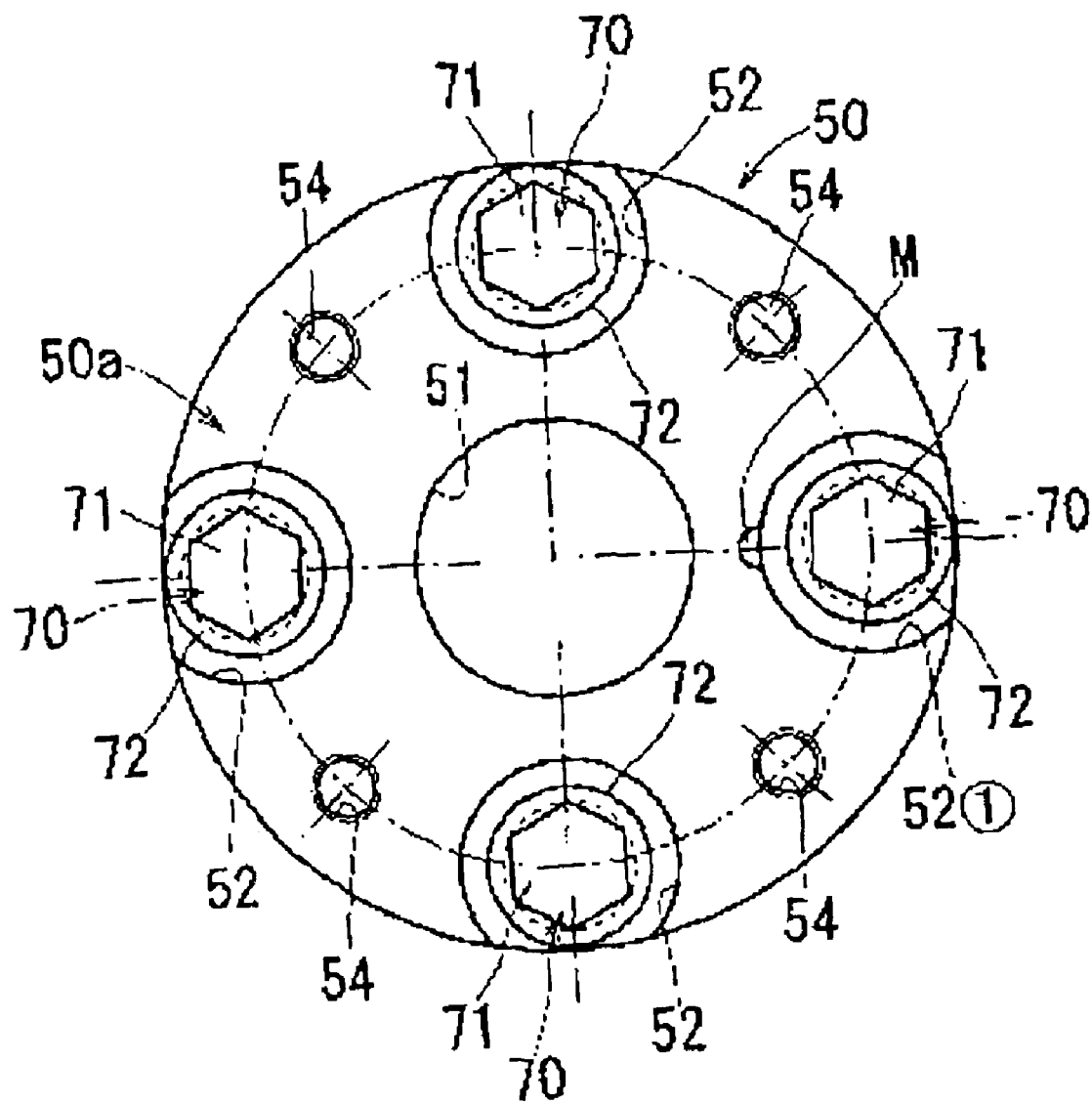
FIG. 2 is an enlarged side elevational view of a pin assembly in accordance with one embodiment of the present invention.

Further, as shown in FIGS. 1, 2 and 3, a collar portion 50 is provided in a side of the base end small diameter portion 34 of the connection pin 16 (a rear end side in an inserting direction). That is, the collar portion 50 is constituted by a disc-like body having an axial hole 51, and the disc-like body is outward fitted to the base end small diameter portion 34 so as to be fixed via a fixing means such as a welding means or the like. Further, in this collar portion 50, four recess portions 52 arranged by a pitch of 90 degrees are provided along a peripheral direction in a side of an outer end surface 50a, and four screw holes 54 shifted by a pitch of about 45 degrees with respect to the recess portions 52 are provided in a peripheral direction. Further, a through hole 53 is provided on a bottom surface of the recess portion 52. Further, a notch portion is provided in a part of an inner peripheral surface of the recess portion 52 indicated by a character ① (refer to FIG. 2), on the outer end surface 50a of the collar portion 50, and the notch portion corresponds to a marking portion M forming a target of a position of the oil reserving recess portion 44 formed on the outer peripheral surface of the connection pin 16.

Next, a hole portion 55 of the boss portion 21 in the arm 5 has end portion small diameter portions 55a and 55b and a center large diameter portion 55c, and when the pin assembly 17 is inserted through the hole portion 55, one end portion of the outer tubular body 15 in the pin assembly 17 is press fitted to one end portion small diameter portion 55a. That is, a peripherally recess portion 56 is provided on an outer peripheral surface of the cylinder body 24 in the outer tubular body 15, and a rear side (a side of the collar portion 50) rather than the peripherally recess portion 56 is press fitted to one end portion small diameter portion 55a of the hole portion 55 in the boss portion 21. That is, a recess peripheral groove 58 is formed in one end side of the cylinder body 24, and a range H from the recess peripheral groove 58 to a rear end edge (a base end edge) of the cylinder body 24, in a rear end side in the inserting direction of the outer tubular body 15 corresponds to a press fit portion 57. In this case, the structure is made such that the press fit portion 57 in the range H is in pressure contact with the end portion small diameter portion 55a of the hole portion 55, at a time of setting an outer diameter size of the cylinder body 24 in the range H slightly larger than an inner diameter size of the end portion small diameter portion 55a of the hole portion 55 in the boss portion 21 and inserting the pin assembly 17 to the hole portion 55 of the boss portion 21. In this case, the cylinder body 24 is structured such that the outer diameter size thereof is set slightly smaller than the inner diameter size of the end portion small diameter portions 55a and 55b in the other portions than the press fit portion 57, thereby being easily inserted.

In this case, hole portions 60 and 61 to which the pin assembly 17 is fitted are respectively provided in the brackets 18 and 19 of the bucket 7, and when the pin assembly 17 is attached thereto, the pin assembly 17 becomes in a state of being fitted to each of the hole portions 60 and 61. Further, one bracket 18 is provided with a screw hole 66 with which a bolt member for fixing is engaged. Four screw holes 66 are arranged by a pitch of about 90 degrees along a peripheral direction in correspondence to the through holes 53 of the collar portion 50 in the pin assembly 17. Further, a fixing device 70 is structured by a bolt member 71 and a spacer 72 to which a shaft portion 71a thereof is inserted. In this case, the spacer 72 is fitted to the through hole 53 of the collar portion 50 in a state of overlapping the collar portion 50 of the pin assembly 17 with the bracket 18, and the shaft portion 71a of the bolt member 71 is engaged with the screw hole 66 of the bracket 18. Accordingly, it is possible to fix the bracket 18 to the collar portion 50. In this case, when the pin assembly 17 is attached, spacers 62 and 63 are respectively interposed between the bracket 18 and he boss portion 21, and, between the bracket 19 and the boss portion 21. In this case, one spacer 62 is constituted by a short cylinder body, and another spacer 63 is constituted by a ring body having an inner collar portion 63a formed in a triangular cross sectional shape in a side of the bracket 19. In this case, an inner surface of the inner collar portion 63a is inclined so as to oppose to the outer surface of the outer collar portion 35a in the leading end tube body 35.

Next, a description will be given of a method of mounting the bucket 7 to the arm 5 by implements connecting apparatus. In this case, first the pin assembly 17 is assembled. That is, the outer tubular body 15 is formed by press fitting the end portion tube bodies 25 and 26 into the cylinder body 24 from both end portions. Further, the connection pin 16 is inserted through the outer tubular body 15. At this time, the base end tube body 36 and the seal apparatus S1 are interposed between the collar portion 50 and the outer tubular body 15 as well as the collar portion 50 is fixed to the connection pin 16. Further, the sliding members 30 and 30 are interposed between the end portion tube bodies 25 and 26 and the connection pin 16, the seal apparatus S2 and the leading end tube body 35 are arranged in the leading end side rather than the outer tubular body 15, and the leading end portion of the connection pin 16 is inserted thereto.

Further, in a state in which the connection pin 16 is inserted through the leading end tube body 35, the seal apparatus S2, the outer tubular body 15 in which the sliding members 30 and 30 are inward provided, the seal apparatus S1 and the base end tube body 36, the pins 40 and 43 are press fitted to the connection pin 16. That is, the pin 40 in the leading end side is press fitted to the through holes 38 and 38 of the leading end tube body 35 and the through hole 39 of the connection pin 16, and the pin 43 in the base end side is press fitted to the through holes 41 and 41 of the base end tube body 36 and the through hole 42 of the connection pin 16. Accordingly, the outer tubular body 15 is held between the leading end tube body 35 and the base end tube body 36 to which the connection pin 16 is fixed, via the seal apparatuses S1 and S2 in a clamping manner, and it is possible to restrict a movement (slide) of the outer tubular body 15 with respect to the connection pin 16 in an axial direction. Further, the collar portion 50, the base end tube body 36, the leading end tube body 35 and the like are fixed to the side of the connection pin 16, and the side of the connection pin 16 can rotate with respect to the outer tubular body 15.

Further, a lubricating oil is charged to the oil reserving portion 64 between the inner peripheral surface of the outer tubular body 15 and the connection pin 16. In this case, a through hole 69 is provided in the cylinder body 24 of the outer tubular body 15, and the lubricating oil is charged into the oil reserving portion 64 via the through hole 69. At this time, the lubricating oil is also charged into the oil reserving recess portion 44. In this case, the through hole 69 is plugged by a plug member 73 or the like after the lubricating oil is charged. That is, the outer tubular body 15 is assembled by press fitting the end portion tube bodies 25 and 26 in which the sliding member 30 (which is impregnated with the lubricating oil) is inward provided to the cylinder body 24, the pin assembly 17 is assembled by inserting the connection pin 16 to the base end tube body 36, the seal apparatus S1, the outer tubular body 15, the seal apparatus S2 and the leading end tube body 35, and the lubricating oil is charged (supplied) in this assembled state.

Next, in a state in which the boss portion 21 of the arm 5 is interposed between a pair of brackets 18 and 19 of the bucket 7, the pin assembly 17 assembled in the manner mentioned above is moved (forwardly moved) in a direction of an arrow A (refer to FIG. 1), and is inserted to the hole portion 60 of one bracket 18, the hole portion 55 of the boss portion 21, and the hole portion 61 of the bracket 19. At this time, the spacers 62 and 63 are interposed respectively between the bracket 18 and the boss portion 21, and between another bracket 19 and the boss portion 21.

Figure 8:
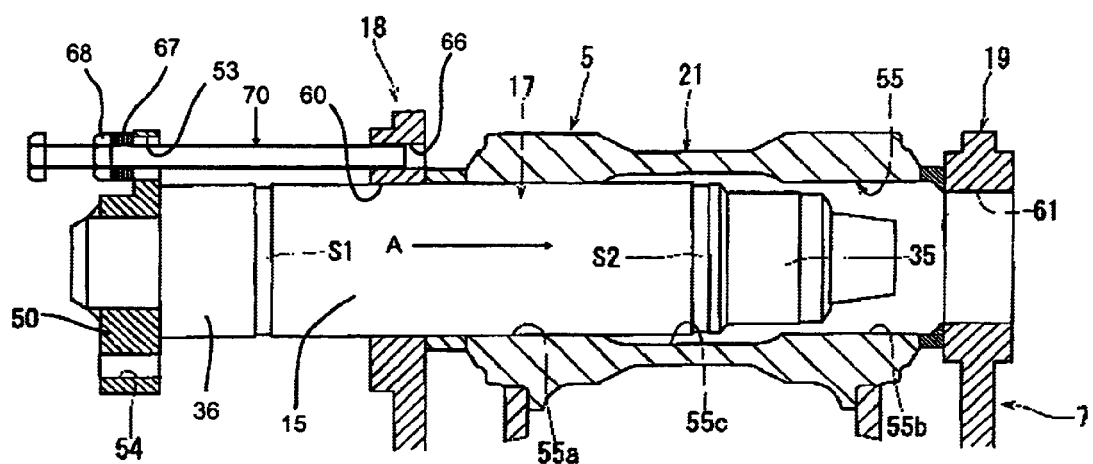
FIG. 8 is a schematic view of a method of connecting implements connecting apparatus.

When the pin assembly 17 is inserted to the boss portion 21 or the like, the pin assembly 17 is forwardly moved along the axial direction thereof as shown by an arrow A, however, since the pin assembly 17 is not press fitted to the hole portion 55 of the boss portion 21 in the side of the leading end in the inserting direction of the pin assembly 17, it is possible to insert at a time of starting insertion easily. However, the press fit portion 57 corresponding to the range H comes near the hole portion 60 of the bracket 18, a bolt member 71 for insertion (a length of which is larger in a shaft portion than the bolt member for fixing) as shown in FIG. 8 is used. At this time, the bolt member 71 is inserted through the through hole 53 of the collar portion 50, and is engaged with the screw hole 66 of the bracket 18. Further, a spacer 67 is outward fitted to the bolt member 71, and a nut member 68 is engaged with the bolt member 71. Accordingly, when the bolt member 71 inserted through the through hole 53 of the collar portion 50 is set to a state in which the bolt member 71 is temporarily fastened to the screw hole 66 of the bracket 18, and the nut member 68 is rotated in a forward screwing direction, the nut member 68 moves forward in a direction of moving close to the bracket 18, and the spacer 67 interposed between the nut member 68 and the collar portion 50 presses the collar portion 50 in a direction of an arrow A. Accordingly, it is possible to press fit the press fit portion 57 into the end portion small diameter portion 55a of the hole portion 55 in the boss portion 21 by screwing the nut members 68 respectively engaged with four bolt members 71 inserted through four through holes 53 so as to move approximately in parallel in the direction of the arrow A.

At this time, the pin assembly 17 becomes in a state in which the leading end tube body 35 is fitted to the hole portion 61 of the bracket 19, and the end tube body 36 is fitted to the hole portion 60 of the bracket 18. Next, four bolt members 71 for insertion are detached and the bolt members 71 are engaged with the screw holes 66 of the bracket 18 for fixing. That is, as shown in FIG. 1, the spacer 72 is fitted to the through hole 53 of the collar portion 50 and the shaft portion 71a is engaged with the screw hole 66 of the bracket 18.

Accordingly, in the pin assembly 17, the connection pin 16 is fixed to one bracket 18 via the collar portion 50. That is, the brackets 18 and 19 are integrally formed with the bucket 7, the bracket 18 and the connection pin 16 are fixed, and the connection pin 16 is fixed to the bucket 7. Further, in this fixed state, since the press fit portion 57 of the outer tubular body 15 in the pin assembly 17 is press fitted to the end portion small diameter portion 55a of the boss portion 21 in the arm 5, the outer tubular body 15 and the boss portion 21 are integrally formed. At this time, since the connection pin 16 is rotatable with respect to the outer tubular body 15, the bucket 7 can swing (rotate) around the axis of the connection pin 16 with respect to the boss portion 21 of the arm 5. That is, in the pin assembly 17, in a state in which the arm 5 and the bucket 7 are connected, the outer tubular body 15 is inserted into the boss portion 21 so as to be fixed to the boss portion 21, and the connection pin 16 rotatably inserted to the outer tubular body 15 is fixed to one bracket 18 in a side of one end portion (a side of the rear end), and is inserted and supported to another bracket 19 in a side of another end portion (a side of the leading end).

Figure 9:
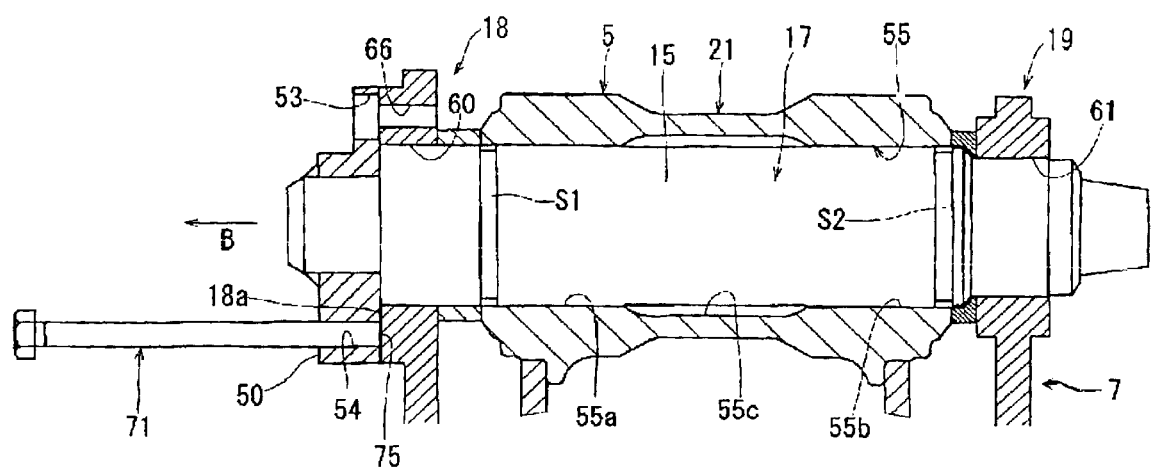
FIG. 9 is a schematic view of a method of separating implements connecting apparatus.
Figure 10:
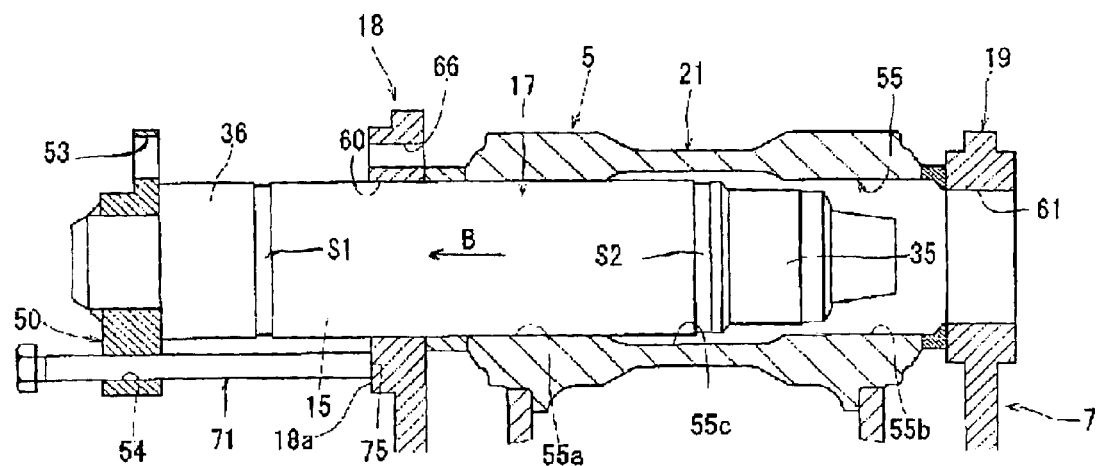
FIG. 10 is a schematic view of a method of separating implements connecting apparatus.

Next, a description will be given of a method of detaching the bucket 7 from the arm 5 in the state in which the arm 5 and the bucket 7 are connected. At this time, as shown in FIGS. 9 and 10, the bolt member 71 which is used at the inserting time is used. That is, since the connection state corresponds to a state in which the outer tubular body 15 of the pin assembly 17 is press fitted to the boss portion 21 in the side of one end portion (the rear side in the side of the base end) of the boss portion 21, it is possible to pull out the pin assembly 17 by applying the pressing force in the opposite side to the inserting direction (the rear side) to the pin assembly 17. Accordingly, the bolt members 71 for fixing are detached, the bolt members 71 for detaching are respectively engaged with four screw holes 54 of the collar portion 50 in the pin assembly 17 in this state, as shown in FIG. 9, and the bolt members 71 are screwed forward with respect to the screw holes 54. Therefore, the leading end surface 75 of the bolt member 71 is brought into contact with a part of the outer surface 18a of the bracket 18. Further, when further screwing forward from this state, the bolt member 71 is screwed forward with respect to the collar portion 50, however, in this case, since the bolt member 71 is brought into contact with a part of the outer surface 18a of the bracket 18, the bolt member 71 can not move forward, and the collar portion 50 moves in a direction of an arrow B with respect to the bolt member 71. Accordingly, when screwing forward four bolt members 71 so that the collar portion 50 moves in parallel in the direction of the arrow B, a whole of the pin assembly 17 moves in the direction of the arrow B with respect to the bracket 18, in correspondence to the movement of the collar portion 50 in the direction of the arrow B. Therefore, the pin assembly 17 can be detached from the brackets 18 and 19 and the boss portion 21. If the pin assembly 17 is pulled out, it is possible to detach the bucket 7 from the arm 5.

In accordance with implements connecting apparatus mentioned above, the bracket 7 and the arm 5 can be connected so as to freely mutually swing by using the pin assembly 17, moving (forward moving) the pin assembly 17 along the axial direction, and inserting the pin assembly 17 to one bracket 18, the boss portion 21 and another bracket 19. Further, when applying the pressing force in the opposite side to the inserting direction (in the rear side) to the pin assembly 17, it is possible to pull out the pin assembly 17, and when the pin assembly 17 is pulled out, it is possible to separate the bracket 7 and the arm 5. That is, it is possible to easily connect and separate the bracket 7 and the arm 5. Particularly, since the assembled pin assembly 17 is used before connecting the bracket 7 and the arm 5, it is possible to intend to shorten the connecting work in the field or the like. Further, in the insertion (connection) state, since the outer tubular body 15 is fixed to the boss portion 21, and the connection pin 16 is fixed to one bracket 18 in the side of one end portion, and is inserted and supported to another bracket 19 in the side of another end portion, the connection state between the bracket 7 and the arm 5 becomes stable.

Further, since the fixing between the outer tubular body 15 of the pin assembly 17 and the boss portion 21 is carried out by the press fit, it is possible to intend to simplify the fixing work between the outer tubular body 15 of the pin assembly 17 and the boss portion 21. Further, since the press fit portion 57 is formed in the rear end side in the inserting direction of the outer tubular body 15, it is possible to easily insert the leading end side thereof at a time of inserting to the pin assembly 17, without being press fitted in the leading end side in the inserting direction of the outer tubular body 15. Accordingly, it is easy to press fit as a whole, and it is possible to intent to improve a connecting operability. Further, when inserting the bolt member 71 through the through hole 53 of the collar portion 50 in the pin assembly 17 and forward screwing the nut member 68 in a state of temporarily fastening to the screw hole 66 of one bracket 18, it is possible to insert the pin assembly 17 to the bracket of the bucket 7 and the boss portion 21 of the arm 5, and it is possible to carry out the connecting work between the bucket 7 and the arm 5 easily and securely. Therefore, it is possible to improve an operability of replacing the bucket 7 or the like, it is possible to achieve a short working time in the working field or the like, and it is possible to achieve an improvement of the working efficiency.

Further, it is possible to fix the collar portion 50 of the pin assembly 17 to one bracket 18 by using the through hole 53 of the pin assembly 17 used at a time of press fitting the pin assembly 17, and the screw hole 66 of the bracket 18, and engaging the bolt member 71 for fixing. Accordingly, it is possible to securely hold the connection state. That is, it is possible to intend to make the structure for fixing common with the structure for press fitting, and it is possible to achieve a simple structure of implements connecting apparatus.

Further, when forward screwing the bolt member 71 with respect to the screw hole 54 of the collar portion 50 in the pin assembly 17, it is possible to pull out the pin assembly 17. Accordingly, it is possible to carry out the work for separating the bucket 7 and the arm 5 easily and securely. Further, it is possible to use the bolt member 71 for inserting as the member for detaching, it is possible to commonly use the parts, and it is possible to reduce the number of the parts used for the attaching and detaching work. Further, since the sliding member 30 is interposed between the connection pin 16 and the outer tubular body 15, the connection pin 16 can smoothly rotate with respect to the outer tubular body 15. Accordingly, it is possible to smoothly carry out the relative swing between the bucket 7 and the arm 5. Further, since the oil reserving recess portion 44 extending along the axial direction is provided on the outer surface of the connection pin 16 of the pin assembly 17, it is possible to reserve the lubricating oil in the oil reserving recess portion 44 on the outer surface of the connection pin, and it is possible to rotate the connection pin 16 with respect to the outer tubular body 15 further smoothly. Further, it is possible to check the position of the oil reserving recess portion 44 by the marking portion M provided on the outer end surface 50a of the collar portion 50 in the pin assembly 17. Accordingly, it is possible to carry out the inserting work of the pin assembly 17 by targeting the marking portion M, and it is possible to intend to improve the assembling operability by the pin assembly 17. The positioning of the oil reserving recess portion 44 is carried out because the structure is made such as to bear the load bearing surface of the pin 16 by a whole of a curved surface so that the oil reserving recess portion 44 is not positioned, for the reason why, for example, a link motion at an excavating time when the bucket tool is dug in the ground has the most highest stress. Further, it is possible to prevent the lubricating oil or the like from flowing out to the external portion from the inner portion of the pin assembly 17 as well as to prevent the foreign materials such as the segment or the like from making an intrusion into the pin assembly 17, by the seal apparatuses S1 and S2.

The description is given above of the specific embodiments of the pin assembly and implements connecting apparatus in accordance with the present invention. However, the present invention is not limited to the embodiment mentioned above, and can be variously changed and carried out within the scope of the present invention. For example, since it is sufficient that the rotation and the axial movement of the outer tubular body 15 is restricted with respect to the boss portion 21, the fixing means between the outer tubular body 15 of the pin assembly 17 and the boss portion 21 may be structured by a spline structure, or may be structured by a noncircular structure in which the outer shape of the outer tubular body 15 and the shape of the hole portion 55 in the boss portion 21 are formed in a noncircular shape. Further, it is sufficient that at least one oil reserving recess portion 44 is provided, however, two or more oil reserving recess portions may be provided. Further, in the embodiment mentioned above, the second member 22 is constituted by the arm 5 of implements, and the first member 20 is constituted by the working means 6 such as the bucket 7 which is connected to the arm 5 so as to be freely replaced, however, implements connecting apparatus may be used in the pivotally connecting means 8 for connecting the boom 4 to the arm 5, the pivotally connecting means 13 for the bracket of the bucket 7, and the like. Further, it is free to increase or decrease the screw hole 66 of the bracket 18, the screw hole 54 of the collar portion 50, and the like, it is not necessary that the number of the bolt members 71 used at a time of inserting the pin assembly 17 corresponds to the number of the screw holes 66 of the bracket 18, and the number of the bolt members 71 for pulling out the pin assembly 17 corresponds to the number of the screw holes 54 of the collar portion 50. In this case, in the embodiment mentioned above, the bolt member 71 for fixing employs the structure in which the shaft portion is shorter than the bolt member 71 used for inserting and detaching, however, they can be all structured by the same bolt member. As mentioned above, in the case of the same bolt member, it is possible to insert the pin assembly 17 by using the bolt member 71 used for fixing and thereafter fix the pin assembly 17 by the bolt member 71. Further, it is possible to detach the fixing bolt member 71 and detach the pin assembly 17 by using the detached bolt member 71. Accordingly, the bolt member for inserting or detaching is not independently required in the replacing work of the bucket or the like in the field or the like, and it is possible to easily carry out the replacing work. Further, in the embodiment mentioned above, the press fit portion 57 is provided in the side of the collar portion 50 (the rear end side in the inserting direction) of the pin assembly 17, however, the press fit portion 57 may be provided in the leading end side in the inserting direction, and may be further provided in both of the rear end side in the inserting direction and the leading end side in the inserting direction.

What is claimed is:

1. A pin assembly for connecting a first member having a pair of brackets to a second member having a boss portion so as to swing freely and mutually in a state in which said boss portion is interposed between a pair of brackets, comprising:

an outer tubular body which is inserted into said boss portion and is fixed to the boss portion; and a connection pin which is rotatably inserted to the outer tubular body, is fixed to one bracket in a side of one end portion thereof, and is inserted and supported to another bracket in a side of another end portion thereof, wherein the outer tubular body and the connection pin are inserted to said one bracket, the boss portion and another bracket, in an assembled state and a sliding member is interposed between said connection pin and the outer tubular body.

2. A pin assembly for connecting a first member having a pair of brackets to a second member having a boss portion so as to swing freely and mutually in a state in which said boss portion is interposed between a pair of brackets, comprising:

an outer tubular body which is inserted into said boss portion and is fixed to the boss portion; and a connection pin which is rotatably inserted to the outer tubular body, is fixed to one bracket in a side of one end portion thereof, and is inserted and supported to another bracket in a side of another end portion thereof, wherein the outer tubular body and the connection pin are inserted to said one bracket, the boss portion and another bracket, in an assembled state, an oil reserving recess portion extending along an axial direction is provided on an outer peripheral surface of said connection pin, a collar portion is provided in a rear end side in the inserting direction of said connection pin, and a marking portion for checking a position of said oil reserving recess portion is provided on an outer end surface of the collar portion.

3. A pin assembly connecting a first member to a second member, the first member having first and second brackets, and the second member having a boss portion; the pin assembly connecting the first and second members so that the boss portion of the second member is interposed between the first and second brackets of the first member, and so that the first and second members swing freely relative to one another;

the pin assembly including:

an outer tubular body received and held in the boss portion of the second member, a connection pin rotatably inserted within the outer tubular body, the connecting pin including a back end with fixing means for fixing the connecting pin to the first bracket of the first member and a front end inserted in and support by the second bracket of the first member; and the outer tubular body and the connection pin being assembled together separately from the first and second members to form an assembled pin assembly, and the assembled pin assembly being inserted in an assembled state into the first and second brackets of the first member bracket and the boss portion of the second member.

4. The pin assembly as claimed in claim 3, wherein the outer tubular body and the boss portion are fixed together by a press fit means.

5. The pin assembly as claimed in claim 4, wherein the assembled pin assembly is inserted into the first and second brackets in an inserting direction, and the fit means includes a press fit portion fitted onto the boss portion at a rear end side thereof relative to the inserting direction of the assembled pin assembly.

6. The pin assembly as claimed in claim 3, wherein a sliding member is interposed between the connection pin and the outer tubular body.

7. The pin assembly as claimed in claim 3, wherein an outer peripheral surface of the connection pin includes an oil-reserving recess portion extending in an axial direction.

8. The pin assembly as claimed in claim 3, wherein the assembled pin assembly is inserted into the first and second brackets in an inserting direction, and the fixing means includes a collar portion provided at a rear end side of the connection pin relative to the inserting direction, and the collar portion has an outer end surface with a marking portion for checking a position of the oil-reserving recess portion.

9. The pin assembly as claimed in claim 3, further comprising a seal apparatus for sealing a rotating side and a fixed side the pin assembly.

10. An implement connecting apparatus for connecting a first member having first and second brackets to a second member having a boss portion interposed between the brackets; the implement comprising a preassembled pin assembly at least having assembled together an outer tubular body, a connection pin rotatably inserted into the outer tubular body, and a sliding member interposed between the outer tubular body and the connecting pin; the first and second members being connected together by moving the preassembled pin assembly in an inserting direction along an axial direction thereof and inserting the preassembled pin assembly successively in the first bracket, the boss, and the second bracket; the preassembled pin assembly connecting the first and second members together so that the first and second members swing freely; and the preassembled pin assembly being arranged with the first and second members, so that the preassembled pin assembly is removed from the first and second members by applying a pressing force thereto in a direction opposite the inserting direction of the preassembled pin assembly.

11. An implement connecting apparatus as claimed in claim 10, wherein one of the first and second brackets includes a screw hole, the preassembled pin assembly includes a collar portion with a through hole, the collar portion being arranged in a rear end side of the preassembled pin assembly relative to the inserting direction thereof, and a bolt member being inserted through the through hole and temporarily fastened to the screw hole to secure the preassembled pin assembly on the one of the first and second brackets.

12. An implement connecting apparatus as claimed in claim 11, wherein a nut member is arranged on the bolt member, and the preassembled pin assembly is inserted into the first bracket of the first member and the boss portion of the second member by screwing the nut member along the bolt member.

13. An implement connecting apparatus as claimed in claim 11, wherein the collar portion of the preassembled pin assembly is fixed to the first bracket by inserting the bolt member through the through hole of the collar portion of the pin assembly and screwing the bolt member into the screw hole of the first bracket.

14. An implement connecting apparatus as claimed in claim 10, wherein a screw hole is provided in the collar portion of the preassembled pin assembly, and the bolt member presses the first bracket by screwing the bolt member into the screw hole so as to pull out the preassembled pin assembly.

15. An implement connecting apparatus as claimed in claim 10, wherein the second member is an arm of implements, and the first member is a bucket secured to the arm of implements in a replaceable manner.

* * * * *